United States Patent
Nadler et al.

(10) Patent No.: US 11,314,892 B2
(45) Date of Patent: Apr. 26, 2022

(54) MITIGATING GOVERNANCE IMPACT ON MACHINE LEARNING

(71) Applicant: International Business Machines Corporation, Armonk, NY (US)

(72) Inventors: Sima Nadler, Kochav Yair (IL); Orna Raz, Haifa (IL); Marcel Zalmanovici, Kiriate Motzkin (IL)

(73) Assignee: International Business Machines Corporation, Armonk, NY (US)

( * ) Notice: Subject to any disclaimer, the term of this patent is extended or adjusted under 35 U.S.C. 154(b) by 555 days.

(21) Appl. No.: 16/452,559

(22) Filed: Jun. 26, 2019

(65) Prior Publication Data
US 2020/0410129 A1  Dec. 31, 2020

(51) Int. Cl.
*G06F 21/62* (2013.01)
*G06K 9/62* (2022.01)
*G06N 20/00* (2019.01)

(52) U.S. Cl.
CPC ....... *G06F 21/6245* (2013.01); *G06K 9/6256* (2013.01); *G06K 9/6262* (2013.01); *G06N 20/00* (2019.01)

(58) Field of Classification Search
CPC . G06N 3/08; G06N 20/00; G06N 5/04; H04L 63/04; H04L 63/12; G06F 21/6245; G06F 21/6254; G06K 9/6262
See application file for complete search history.

(56) References Cited

U.S. PATENT DOCUMENTS

| | | |
|---|---|---|
| 2017/0330109 A1 | 11/2017 | Maughan et al. |
| 2017/0372232 A1* | 12/2017 | Maughan ............... G06F 3/0482 |
| 2018/0018590 A1 | 1/2018 | Szeto et al. |
| 2020/0159828 A1* | 5/2020 | Reisswig ................ G06F 40/30 |

OTHER PUBLICATIONS

Craig et al., Enabling Data Quality for Machine Learning and Artificial Intelligence. Gartner.com; ID: G00355685; Aug. 22, 2018.

* cited by examiner

*Primary Examiner* — Olugbenga O Idowu
(74) *Attorney, Agent, or Firm* — Ziv Glazberg

(57) ABSTRACT

A method, a computerized apparatus and a computer program product for mitigating governance and regulation implications on machine learning. A governance impact assessment is generated for a partial data set generated by applying a data governance enforcement on a data set of instances comprising valuations of a feature vector. The partial data set comprises partial instances each comprising partial feature vectors. The governance impact assessment comprises information about data excluded from the data set. A machine learning model trained based on the partial data set and configured to provide an estimated prediction for a partial instance is obtained. A set of core features is determined. A bias introduced by the data governance is identified based on a core feature being affected by the data governance. In response to identifying a bias, an anti-bias procedure is applied on the machine learning model, whereby mitigating the bias introduced by the data governance.

20 Claims, 15 Drawing Sheets

| Search Criteria | Description |
|---|---|
| Access Enforcer | Access enforcer indicates who made the decision to allow or deny. In case of HDFS, the enforcer would XA (Ranger) or Hadoop. |
| Access Type | Type of access user has for e.g read, write |
| Start date, End date | Time and date is stored for each access. A date range is used to filter the results for that particular date range. |
| Service Name | The name of the service which the user tries to access |
| Service Type | The type of the service which the user tries to access |
| Result | This shows whether the operation was successful or not |
| User | Name of the user which tried to access the resource |
| Client ip | IP address of the user system which tried to access the resource |

FIG. 4

| Purpose Commercial Use of Census Data (ACTIVE), Version 1, State: ACTIVE - Latest Version |
|---|

ID 3
Version 1
Name Commercial Use of Census Data
State ACTIVE
Access types Process
Type
Geography
Description
>

| Purpose Data | | | |
|---|---|---|---|
| Data - | Access Types | Retention | Mandatory |
| Age | Process | | Yes |
| City | Process | | Yes |
| Gender | Process | | Yes |
| Occupation | Process | | Yes |
| PUMA | Process | | Yes |
| Salary | Process | | Yes |
| State | Process | | Yes |

FIG. 7

Policy No Export of Californians Data, Verson 1 Created 2018-11-21 15:30:29, Last Modified 2018-11-21 15:30:29

| | |
|---|---|
| ID | 1381 |
| Name | No Export of Californians Data |
| Priority | 10 |
| Collection Basis | Transparency |
| Disclosable to end users? | Yes |
| When collecting consent set default value to allow? | No |
| Parent Policy | |
| Policy Type | |
| Obfuscation Method | |
| Description | |

✓ Do not allow information of California residents to be exported due to strict California privacy laws
<u>Policy logic (Javascript)</u>
✓ return deny ('Not allowed');

| Policy Conditions ⊞ | | | | | |
|---|---|---|---|---|---|
| Purpose ▲ | Purpose Type | Data Category | Data Access Type | Geography Group | ConsenterType |
| | | | Export | California | |

FIG. 8

Consents (12)

Search: [ID] [value] 🔍 ⊕ ▦  ?Help

| ID | Consenter | State | Purpose | Purpose Data | Data Value | Consent by | Start Date | EndDate |
|---|---|---|---|---|---|---|---|---|
| 14982 | john.doe@gmail.com | OPT IN | Commercial Use of Census Data (ACTIVE) | Age | | | 2018-11-22 | |
| 14983 | john.doe@gmail.com | OPT IN | Commercial Use of Census Data (ACTIVE) | City | | | 2018-11-22 | |
| 14984 | john.doe@gmail.com | OPT IN | Commercial Use of Census Data (ACTIVE) | Gender | | | 2018-11-22 | |
| 14985 | john.doe@gmail.com | OPT IN | Commercial Use of Census Data (ACTIVE) | Occupation | | | 2018-11-22 | |
| 14986 | john.doe@gmail.com | OPT IN | Commercial Use of Census Data (ACTIVE) | Salary | | | 2018-11-22 | |
| 14987 | john.doe@gmail.com | OPT IN | Commercial Use of Census Data (ACTIVE) | State | | | 2018-11-22 | |
| 14988 | sally.smith@gmail.com | OPT OUT | Commercial Use of Census Data (ACTIVE) | Age | | | 2018-11-22 | |
| 14989 | sally.smith@gmail.com | OPT OUT | Commercial Use of Census Data (ACTIVE) | City | | | 2018-11-22 | |
| 14990 | sally.smith@gmail.com | OPT OUT | Commercial Use of Census Data (ACTIVE) | Gender | | | 2018-11-22 | |
| 14991 | sally.smith@gmail.com | OPT OUT | Commercial Use of Census Data (ACTIVE) | Occupation | | | 2018-11-22 | |
| 14992 | sally.smith@gmail.com | OPT OUT | Commercial Use of Census Data (ACTIVE) | Salary | | | 2018-11-22 | |
| 14993 | sally.smith@gmail.com | OPT OUT | Commercial Use of Census Data (ACTIVE) | State | | | 2018-11-22 | |

FIG. 9

Purpose: Commercial Use of Census Data

Consenter: john.doe@gmail.com ▾

Decisions ▦

| Approved? ▲ | Data | Value | Reason | Reason Code | Policy Decision | Policy | Consent ID | Consent State |
|---|---|---|---|---|---|---|---|---|
| No | Age | | policy decision deny | 2 | deny | No Export of Californians Data | | |

Consenter: sally.smith@gmail.com ▾

Decisions ▦

| Approved? ▲ | Data | Value | Reason | Reason Code | Policy Decision | Policy | Consent ID | Consent State |
|---|---|---|---|---|---|---|---|---|
| No | Gender | | subject opted out from purpose | 45 | explicit assent | | 14990 | OPT OUT |

Consenter: harry.harrison@gmail.com ▾

Decisions ▦

| Approved? ▲ | Data | Value | Reason | Reason Code | Policy Decision | Policy | Consent ID | Consent State |
|---|---|---|---|---|---|---|---|---|
| Yes | State | | subject opted in to purpose | 43 | explicit assent | | 14994 | OPT IN |

FIG. 10

```
{
    "purpose_id": int,
    "percent_data_subjects_included": float,
    "data_items_completely_excluded": [ { "data_item_id": int } ],
    "data_items_included": [ {
        "percent_included": float,
        "exclusions" : [ {
            "num_data_subjects_excluded": int,
            "exclusion_reason_codes": [ {
                "reason_code": int,
                "num_excluded_for_reason": int } ],
        } ],
        "inclusions" : [ {
            "num_data_subjects_included": int,
            "inclusion_reason_codes": [ {
                "reason_code": int,
                "num_included_for_reason": int } ],
        } ]
    } ]
}
```

FIG. 11

```
{
    "purpose_id": int,
    "num_data_subjects_included": int,
    "num_data_subjects_excluded": int,
    "data_items": [ {
        "data_subjects_included": [ {
          "data_subject_id": int,
          "reason_code_for_inclusion": int,
          "policy_id": int
        } ],
        "data_subjects_excluded": [
          "data_subject_id": int,
          "reason_code_for_inclusion": int,
          "policy_id": int ]
        }
    ] }
```

FIG. 12

```
{
    "purpose_id": int,
    "num_data_subjects_included": int,
    "num_data_subjects_excluded": int,
    "data_items": [ {
        "data_subjects_included": [ {
            data_subject: {
                "data_subject_id": int,    "street": string,
                "city": int,               "state": int,
                "country": int,            "age": int,
                "gender": int,             "race": int
            }
            "reason_code_for_inclusion": int,
            "policy_id": int
        } ],
        "data_subjects_excluded": [
          # each would be assigned a profile_feature_id
          data_subject: {
                "data_subject_id": int,    "street": string,
                "city": int,               "state": int,
                "country": int,            "age": int,
                "gender": int,             "race": int
          }
          "reason_code_for_inclusion": int,
          "policy_id": int
    ] }
] }
```

FIG. 13

```
{
    "purpose_id": int,
    "percent_data_subjects_included": float,
    "data_items_completely_excluded": [ { "data_item_id": int } ],
    "data_items_included": [ {
        "percent_included": float,
        "exclusions" : [
          {
            "num_data_subjects_excluded": int,
            "exclusion_reason_codes": [
              { "reason_code": int,
                "num_excluded_for_reason": int }
            ],
            "profile_feature_exclusions:": [
              feature: {
                profile_feature_id: int,
                percent_excluded: float
              } ]
        } ],
        "inclusions" : [ {
            "num_data_subjects_included": int,
            "inclusion_reason_codes": [
              { "reason_code": int,
                "num_included_for_reason": int }
            ],
            "profile_feature_inclusions:": [
              feature: {
                profile_feature_id: int,
                percent_included: float
              } ]
        } ]
    } ]
}
```

FIG. 14

*Model features*
Index[['SPORDER', 'ST', 'ADJINC', 'PWGTP', 'AGEP', 'CIT', 'COW', 'DOORS', 'DEAR', 'DEYE',
...
'FSEMP', 'FSEXP', 'FSSIP', 'FSSP', 'FWAGP', 'FWKHP', 'FWKLP', 'FWKWP', 'FWRKP',
'FYOEP'], dtype='object', length=155)

*Redacted features (Governance)*
{'AGEP', 'ST', 'PUMA', 'POWPUMA'}

```
WARNING
Dominant model features are under-represented: [AGEP, ST]
WARNING
```

FIG. 15

MITIGATING GOVERNANCE IMPACT ON MACHINE LEARNING

TECHNICAL FIELD

The present disclosure relates to machine learning in general, and to governance and regulation implications on machine learning, in particular.

BACKGROUND

Machine learning based solutions are becoming increasingly popular and pervasive. Many computer systems utilize machine learning models to effectively perform a specific task without using explicit instructions, relying on patterns and inference instead. Machine learning algorithms are used in a wide variety of applications, such as email filtering, and computer vision, where it is infeasible to develop an algorithm of specific instructions for performing the task.

Machine learning systems are highly dependent on quality training data in order to build and train the model. The machine learning results are only as good as the data on which they were trained and the data they receive during production. On the other hand, data governance laws and policies dictate when and how personal data may be used.

Data governance laws and policies ensure transparency about what personal data is collected or processed and for what purpose. Data governance laws and policies provide more control to data subjects about the purposes for which their personal data may be used. Furthermore, data governance laws and policies enable the data subject to receive, repair, request the deletion of personal data in some situations, as well as indicate that they do not want their personal data used for particular purposes.

BRIEF SUMMARY

One exemplary embodiment of the disclosed subject matter is a method comprising: obtaining a governance impact assessment for a partial data set. The partial data set may be generated by applying a data governance enforcement on a data set. The data set may comprise instances, each of which comprises a valuation of a feature vector. The partial data set may comprise partial instances each of which comprises a partial feature vector that is based on a subset of the feature vector. The governance impact assessment may comprise information about data excluded from the data set. The method further comprises obtaining a machine learning model. The machine learning model may be trained based on the partial data set. The machine learning model may be configured to provide an estimated prediction for a partial instance. The method further comprises determining a set of core features. For each core feature in the set of core features, the method further comprises determining whether the governance impact assessment indicates that the core feature is affected by the data governance, whereby identifying a bias introduced by the data governance. In response to the identification of the bias, the method comprises applying an anti-bias procedure on the machine learning model, whereby mitigating the bias introduced by the data governance.

Another exemplary embodiment of the disclosed subject matter is a computerized apparatus having a processor, the processor being adapted to perform the steps of: obtaining a governance impact assessment for a partial data set, wherein the partial data set is generated by applying a data governance enforcement on a data set, wherein the data set comprises instances, each of which comprises a valuation of a feature vector, wherein the partial data set comprises partial instances each of which comprises a partial feature vector that is based on a subset of the feature vector, wherein the governance impact assessment comprises information about data excluded from the data set; obtaining a machine learning model, wherein the machine learning model is trained based on the partial data set, wherein the machine learning model is configured to provide an estimated prediction for a partial instance; determining a set of core features; for each core feature in the set of core features, determining whether the governance impact assessment indicates that the core feature is affected by the data governance, whereby identifying a bias introduced by the data governance; and in response to the identification of the bias, applying an anti-bias procedure on the machine learning model, whereby mitigating the bias introduced by the data governance.

Yet another exemplary embodiment of the disclosed subject matter is a computer program product comprising a non-transitory computer readable storage medium retaining program instructions, which program instructions when read by a processor, cause the processor to perform a method comprising: obtaining a governance impact assessment for a partial data set, wherein the partial data set is generated by applying a data governance enforcement on a data set, wherein the data set comprises instances, each of which comprises a valuation of a feature vector, wherein the partial data set comprises partial instances each of which comprises a partial feature vector that is based on a subset of the feature vector, wherein the governance impact assessment comprises information about data excluded from the data set; obtaining a machine learning model, wherein the machine learning model is trained based on the partial data set, wherein the machine learning model is configured to provide an estimated prediction for a partial instance; determining a set of core features; for each core feature in the set of core features, determining whether the governance impact assessment indicates that the core feature is affected by the data governance, whereby identifying a bias introduced by the data governance; and in response to the identification of the bias, applying an anti-bias procedure on the machine learning model, whereby mitigating the bias introduced by the data governance.

THE BRIEF DESCRIPTION OF THE SEVERAL VIEWS OF THE DRAWINGS

The present disclosed subject matter will be understood and appreciated more fully from the following detailed description taken in conjunction with the drawings in which corresponding or like numerals or characters indicate corresponding or like components. Unless indicated otherwise, the drawings provide exemplary embodiments or aspects of the disclosure and do not limit the scope of the disclosure. In the drawings:

FIG. 4 shows a governance log data, in accordance with some exemplary embodiments of the disclosed subject matter;

FIG. 7 shows a schematic illustration of purpose indicating commercial use of census data, in accordance with some exemplary embodiments of the disclosed subject matter;

FIG. 8 shows a schematic illustration of a policy indicating allowed use of personal data, in accordance with some exemplary embodiments of the disclosed subject matter;

FIG. 9 shows a schematic illustration of Users' consent information, in accordance with some exemplary embodiments of the disclosed subject matter;

FIG. 10 shows a schematic illustration of governance queries, in accordance with some exemplary embodiments of the disclosed subject matter;

FIG. 11 shows a schematic illustration of interim governance data, in accordance with some exemplary embodiments of the disclosed subject matter;

FIG. 12 shows a schematic illustration of a summary of included and excluded data, in accordance with some exemplary embodiments of the disclosed subject matter;

FIG. 13 shows a schematic illustration of a summary of included and excluded data, in accordance with some exemplary embodiments of the disclosed subject matter;

FIG. 14 shows a schematic illustration of a governance impact summary, in accordance with some exemplary embodiments of the disclosed subject matter; and FIG. 15 shows a schematic illustration of intersection of machine learning model important features and governance implications features, in accordance with some exemplary embodiments of the disclosed subject matter.

DETAILED DESCRIPTION

Figure 1A:
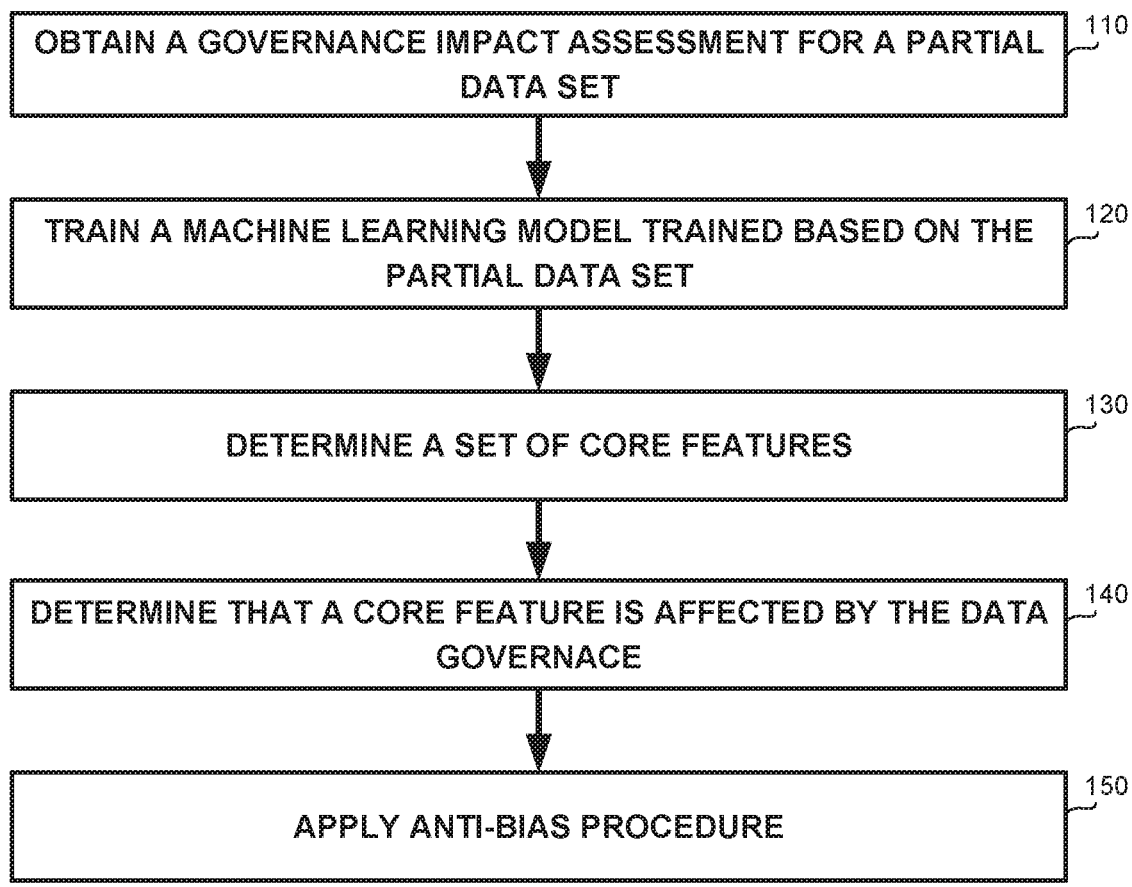
FIGS. 1A-1B show a flowchart diagrams of a method, in accordance with some exemplary embodiments of the disclosed subject matter.

One technical problem dealt with by the disclosed subject matter is to detect and alleviate governance induced bias in machine learning models. Efficacy of machine learning systems may be highly dependent on the data on which they are trained and the data they receive during production. However, current data governance policies and privacy laws may dictate when and how personal and other sensitive data may be used. This may affect the amount and quality of personal data included for training, potentially introducing bias and other inaccuracies into the model. In some exemplary embodiments, existing mechanisms may not provide a way for the model developer to know about such bias. Additionally or alternatively, existing mechanisms may not provide a way for the model developer to alleviate the bias.

In some exemplary embodiments, in accordance with data governance policies and privacy laws, personal data may be partially used, not used at all, used with conditions, obfuscated, or the like. As an example, for some purposes, the data may not be used at all, for other purposes consent may be required in order to use the data, in other purposes the data may be used based on contract or legitimate business, or the like.

In some exemplary embodiments, in cases where personal data or other sensitive information cannot be used or requires consent, the data sets used to train machine learning models may be a subset of the data. As an example, if the data set does not include, age, race, or gender, then there may be no way to know that the data is not representative of the real target population. Using subsets of the data to train the machine learning model may have a potential to introduce bias into the model and other potential inaccuracies—without the solution creator having any idea of the potential problem. In some exemplary embodiments, data sets may be augmented with meta data describing what is included in the data set, but may include nothing about what has been excluded and why. As an example, for creating a model to predict the need for public transportation in a given neighborhood, information from current public transportation use, population size, or other relevant data may be utilized. However, there may be laws restricting the use, such as location data and transportation use of minors. Thus, the training set for the machine learning-based solution for transportation planning may not include data about people under the age of 18. This may introduce bias into the model, since the transportation patterns of children may not be included.

Additionally or alternatively, in some fields the bias may be known and introduced. When the bias introduction is known, it may be accounted for and corrected. As an example, in the pharmaceutical industry, pregnant women and children may not be included in clinical trials for drug development. As another example, in automated resume review systems, populations currently employed may be the ones for which the machine learning system may naturally be biased. However, a method for mitigating such bias may be required.

Another technical problem dealt with by the disclosed subject matter is to measure and mitigate the implication of features not being included in the training data on the training process. It may be noted that machine learning can only utilize the data that exists. When features are excluded from the data, they may be excluded from any model that uses that data for training Excluding features that are relevant to the learning model, may have negative implications on the machine learning process. It may be highly challenging to check such implications as the machine learning model will not be trained on these features.

One technical solution is to alleviate governance induced bias in machine learning models by capturing information about data being excluded and why. The information may be used for identifying and alleviating governance implications on machine learning models.

In some exemplary embodiments, governance implications may be defined and implemented as meta data to be added to the output of governance enforcement tools. Such metadata may comprise a governance impact summary based on the governance enforcement. In some exemplary embodiments, data governance tools may be utilized to enforce proper usage of personal or sensitive data as defined by policies, data subject preferences, or the like. As data is accessed, stored, or transferred the governance module may be responsible for invoking the governance policies on the data, such as to filter out certain data, obfuscate the data, allow the data to be used as is, or the like. During the invocation, the governance module may log the actions performed on the data, information on what a decision regarding the data is based on, or the like. As an example, log data of the open source governance module Apache Ranger™, or IBM™ Research's Data Policy and Consent Management (DPCM) tool, or the like, may be utilized. In some exemplary embodiments, the governance decisions log may be parsed and a summary may be generated based thereon.

In some exemplary embodiments, the governance impact summary may comprise the size of the original data set in comparison with the size of the derived data set, list of features removed from the data set and the removal reasons, percentage of data subjects included in the derived data set, effects on features included in the derived data set, affected features in the derived set, or the like. As an example, the governance impact summary may comprise data in the form of x % of people over age 60, y % of people from California, or the like.

In some exemplary embodiments, governance impact on features included in the derived data set may be analyzed, to determine whether the excluded data records introduce bias into the machine learning model. In some exemplary embodiments, affected features in the data set may be suspected of bias, if such features are high-importance features in the model trained using the given data. Bias-suspected features may be features that belong to the intersection of the affected-features group and the important-features group. Important-features may be determined once a model has been trained, based on the model itself, via black box techniques such as LIME™, or the like. Identified bias-suspected features may be sent to an entity that holds the entire data set, such as the data owner, for bias detection. It may be appreciated that identifying the suspected features is an important input for directing the bias detection techniques.

Additionally or alternatively, governance impact on features not included in the derived data set may be analyzed, to check implications thereof on the machine learning model. As the entire data set may be available to its owner, the data owner or any other entity that has access to the full data may be set to run risk assessment code on the full data set, based on the machine learning model learned from the partial data set. As an example, the governance implications technique may be configured to create a feature relevance function and send it to the owner of the original data set for execution. The owner may run the function on the full data set, and returns a score for each feature that was removed from the derived data set. A high score may indicate that the removed feature affects the model.

In some exemplary embodiments, the feature relevance function may be implemented based on the distribution of values of the excluded features per the model classification or prediction categories. The implication score may be raised if the distribution is significantly different per category. The significance may be determined according to a significance-level parameter used by a statistical test. As an example, when applying a non-parametric distribution identify test, such as Kolmogorov-Smirnov (KS) test, the significance-level parameter may be about 0.05. Such significance-level parameter may be indicative that the likelihood of the KS test determining that the null hypothesis (e.g., distributions are the same) is false when it is true may be at most over 5% of the answers. Additional significance-level parameters may be used, such as about 0.01, about 0.05, about 0.1, or the like.

Additionally or alternatively, the implementation of the feature relevance function may involve retaining the model, when possible. The feature relevance function may require the owner to re-train a model while adding a single excluded feature every time, all excluded features, or the like. The implication score may be raised if the results are significantly different compared to those of the model trained on the data without the excluded features.

One technical effect of utilizing the disclosed subject matter is to identify bias in the machine learning model without being exposed to the original data set. The suspected features may be provided as an input for directing the bias detection techniques. The information may be provided so that any bias detection technique can utilize it, such as by the data owner or any other entity that holds the entire dataset, without risking sensitive or personal data.

Another technical effect of utilizing the disclosed subject matter is to provide governance implications as meta data that can be utilized for further implication analysis by different techniques. The potential implications of governance laws and policies may be defined as they pertain to machine learning based on governed data. The encoding of governance implications may be demonstrated via a governance enforcement engine as meta data that can be utilized for further implication analysis.

The disclosed subject matter may provide for one or more technical improvements over any pre-existing technique and any technique that has previously become routine or conventional in the art.

Additional technical problem, solution and effects may be apparent to a person of ordinary skill in the art in view of the present disclosure.

Referring now to FIG. 1A showing a flowchart diagram of a method, in accordance with some exemplary embodiments of the disclosed subject matter.

On Step 110, a governance impact assessment for a partial data set may be obtained. In some exemplary embodiments, the governance impact assessment may comprise information about data excluded from a data set, or data that has been obfuscated, as an impact of applying a data governance enforcement policy thereon. The data set may comprise instances, each of which comprises a valuation of a feature vector. The partial data set resulting from applying the governance impact enforcement policy on the data set, may comprise partial instances. Each partial instance may comprise a partial feature vector. The partial feature vector may be determined based on a subset of the feature vector. As an example, the partial feature vector may be subset of the feature vector, excluding a portion of the features of the feature vector. As another example, the partial feature vector may be an obfuscated version of a subset of the feature vector, where some of the features thereof are obfuscated.

On Step 120, a machine learning model may be trained based on the partial data set. The machine learning model may be configured to provide an estimated prediction for a partial instance similar to instances in the partial data set.

On Step 130, a set of core features may be determined. In some exemplary embodiments, core features may be features that are important to the model, such as for providing the estimated prediction. The set of core features may be determined based on the machine learning model. As an example, features in the vector feature utilized to determine the estimated prediction may be considered as core features. Additionally or alternatively, black box techniques such as Local interpretable model-agnostic explanations (LIME™) may be utilized to determine the set of core features.

In some exemplary embodiments, the set of core features may comprise dominant features and target features. Target features may be core features that are determined based on definition of the machine learning model. Dominant features may be core features that are determined based on analysis of the machine learning model. As example, the input features may be: age, height, weight, gender. One target may be defined as gender. That is, given age, height and weight of a person, the machine learning model may be configured to determine the gender of that person. The trained machine learning model may have learned that height and weight have a large affect as related to the gender where age does not. Therefore, the model dominant features are height and weight (but not age)

On Step 140, each core feature in the set of core features may be inspected to determine whether the governance impact assessment indicates that the core feature is affected by the data governance. In some exemplary embodiments, a bias introduced by the data governance may be identified based on determining that a core feature is affected by the data governance, e.g., excluded from or obfuscated in the partial feature vector.

On Step 150, in response to the identification of the bias, an anti-bias procedure on may be applied on the machine learning model, to mitigate the bias.

As an example, IBM AI Fairness 360 (AIF360) anti-bias procedure may be applied. AIF360 may be configured to check for unwanted bias in datasets and machine learning models, to mitigate such bias.

Figure 1B:
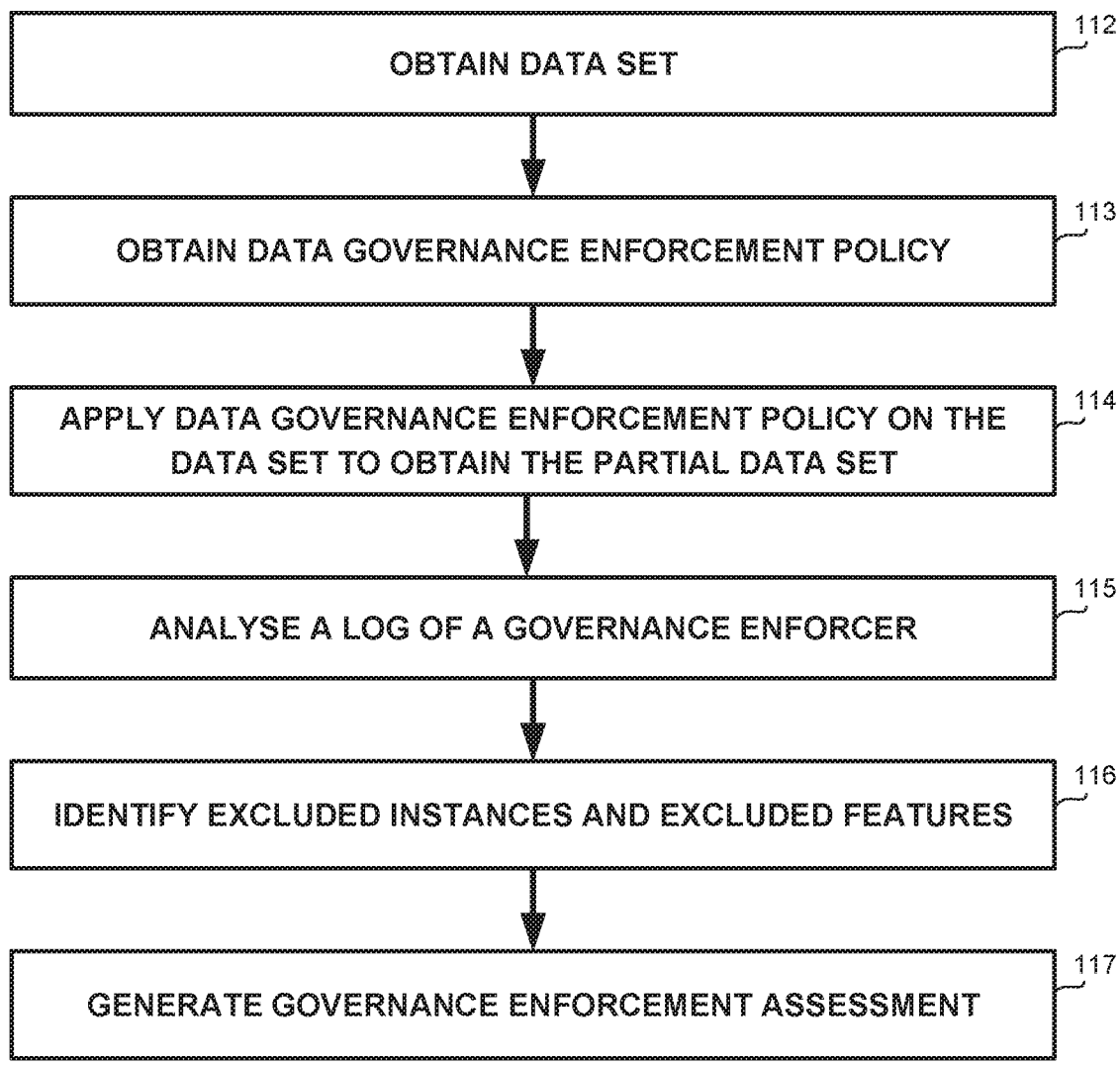

Referring now to FIG. 1B showing a flowchart diagram of a method, in accordance with some exemplary embodiments of the disclosed subject matter.

On Step 112, a data set may be obtained. In some exemplary embodiments, the data set may comprise sensitive data, Personally Identifiable Information (PII), or the like. An access to the data set may be available to limited entities.

On Step 113, a data governance enforcement policy may be obtained. In some exemplary embodiments, data governance enforcement policy may be configured to regulate the use of the data set, such as by limiting the use of personal and other types of sensitive data. As an example, the data governance enforcement policy may be based on the European General Data Protection Regulation (GDPR) which aims to strengthen data subject privacy protection, unify the data regulations across the member states, and broaden the territorial scope of the companies that fall under its jurisdiction to address non-EU companies who provide services to EU residents, or the like. As another example, the data governance enforcement policy may be based on the United States privacy laws, such as Health Insurance Portability and Accountability Act (HIPAA) governing the health care industry as it relates to digital health data, or the like.

On Step 114, the data governance enforcement policy may be applied on the data set to obtain the partial data set. In some exemplary embodiments, the data governance enforcement policy may be applied on the data set using a governance enforcer. As an example, a DPCM tool may be utilized as a governance enforcer. DPCM may be configured to apply the policies and laws as well as the preferences of the data subjects indicating their willingness or lack thereof for their personal data to be used for different purposes in accordance with the data governance enforcement policy.

On Step 115, a log of the governance enforcer may be analyzed. In some exemplary embodiments, the governance enforcer may be configured to apply the data governance enforcement policy on the data set.

As an example, the governance decisions log of the DPCM may be parsed and analyzed to determine: original vs derived data set size, list of features removed from the data set and the removal reasons (e.g., policies), percentage of data subjects included in the derived data set, and effect on features included in the derived data set.

On Step 116, excluded instances that are excluded from the partial data set and excluded features that are excluded from the partial feature vector may be identified.

On Step 117, a governance impact assessment may be generated. In some exemplary embodiments, the governance impact assessment may comprise a summary of excluded features and excluded instances from the partial data set. Additionally or alternatively, the governance impact assessment additional metadata, such as original vs. partial data set size, list of features removed from the data set and the removal reasons (policies), percentage of data subjects included in the derived data set, effect on features included in the derived data set, or the like.

The governance impact assessment may provide important additional information which may be taken into account when building and running machine learning models similar to the machine learning model.

Figure 2:
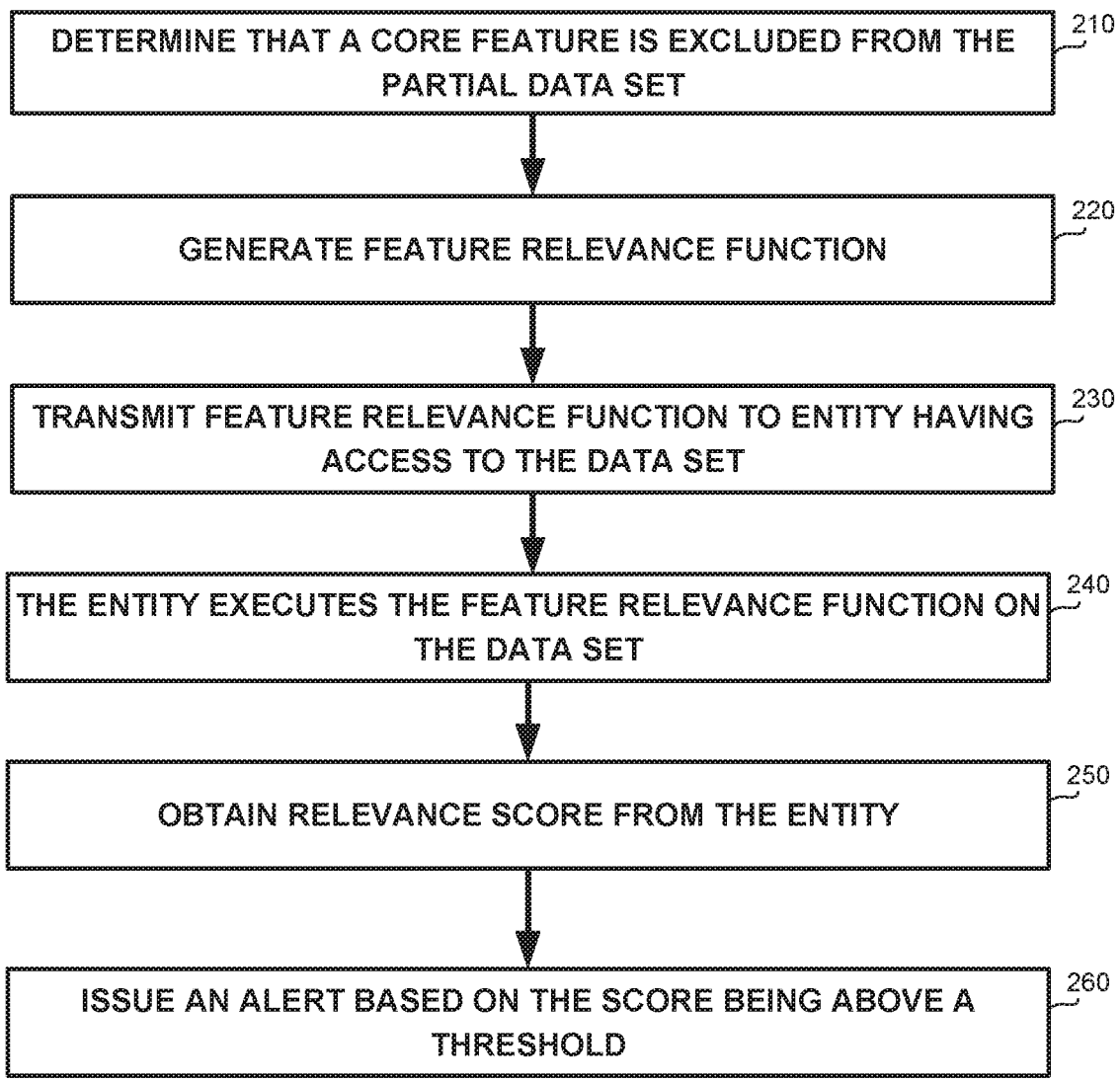
FIG. 2 shows a flowchart diagrams of a method, in accordance with some exemplary embodiments of the disclosed subject matter.

Referring now to FIG. 2 showing a flowchart diagram of a method, in accordance with some exemplary embodiments of the disclosed subject matter.

On Step 210, a core feature of the set of core features may be determined to be excluded or obfuscated from the partial data set, based on the governance impact assessment.

On Step 220, a feature relevance function for the excluded core feature may be generated. In some exemplary embodiments, the feature relevance function may be configured to provide a relevance score of the excluded core feature to the prediction made by the machine learning model.

In some exemplary embodiments, the feature relevance function may be determined based on a distribution of values of the excluded code feature in different prediction categories. The prediction categories may be defined using the machine learning model.

Additionally or alternatively, the feature relevance function may be determined based on a difference in performance measurement of the machine learning model compared to an alternative machine learning model. The alternative machine learning model may be trained using an augmented data set that comprises augmented instances each of which comprises valuation of the partial feature vector and of the excluded feature.

On Step 230, the feature relevance function may be transmitted to an entity having access to the data set.

On Step 240, the feature relevance function may be executed, by the entity, on the data set. A relevance score may be computed based on an execution of the feature relevance function on the data set.

On Step 250, the relevance score may be obtained from the entity.

On Step 260, an alert may be issued in response to the relevance score being above a predetermined threshold.

Figure 3:
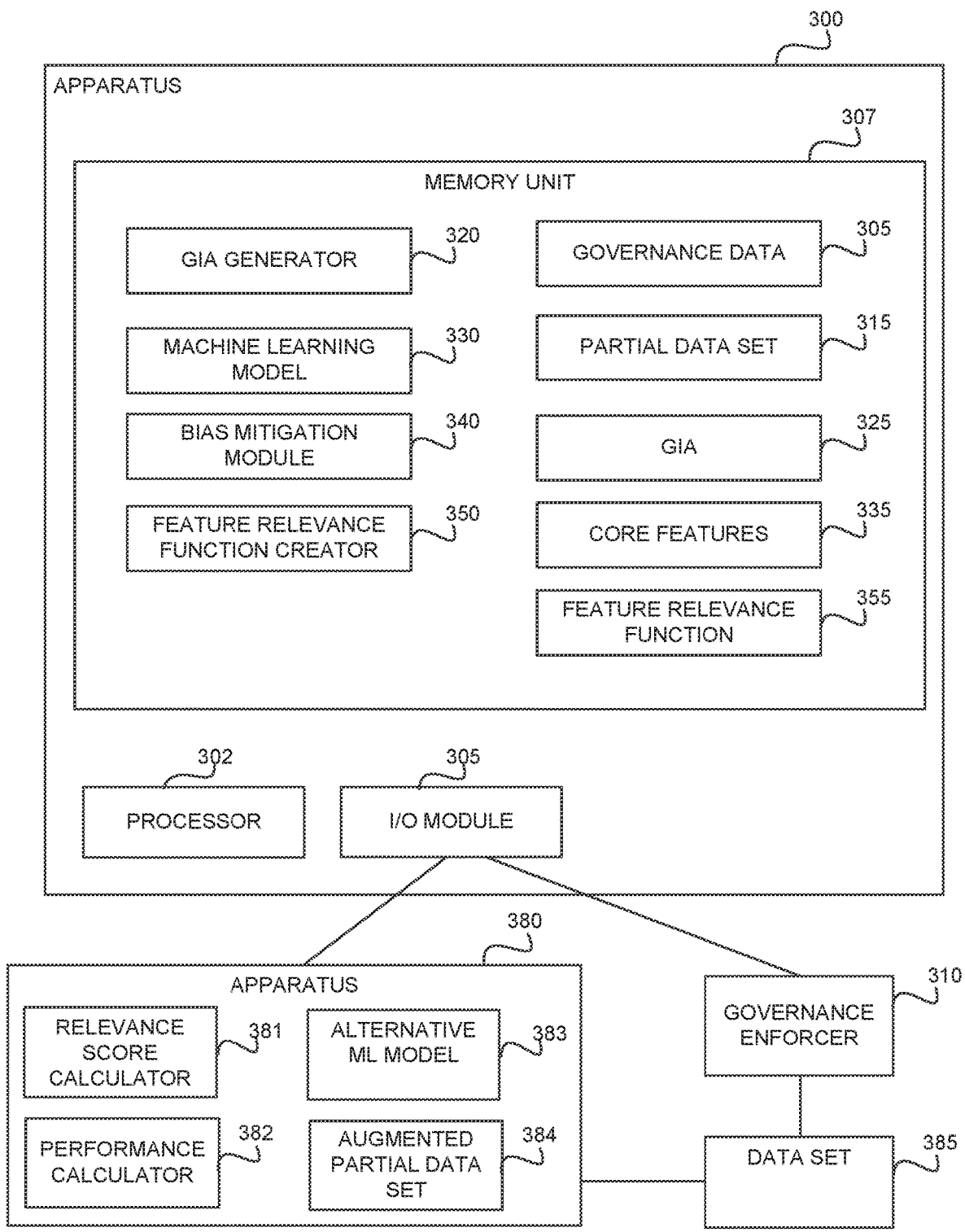
FIG. 3 shows a block diagram of an apparatus, in accordance with some exemplary embodiments of the disclosed subject matter.

Referring now to FIG. 3 showing a block diagram of an apparatus, in accordance with some exemplary embodiments of the disclosed subject matter.

An Apparatus 300 may be configured to support parallel user interaction with a real world physical system and a digital representation thereof, in accordance with the disclosed subject matter.

In some exemplary embodiments, Apparatus 300 may comprise one or more Processor(s) 302. Processor 302 may be a Central Processing Unit (CPU), a microprocessor, an electronic circuit, an Integrated Circuit (IC) or the like. Processor 302 may be utilized to perform computations required by Apparatus 300 or any of it subcomponents.

In some exemplary embodiments of the disclosed subject matter, Apparatus 300 may comprise an Input/Output (I/O) module 305. I/O Module 305 may be utilized to provide an output to and receive input from a user, such as, for example obtaining data enforcement rules, data, or the like.

In some exemplary embodiments, Apparatus 300 may comprise Memory 307. Memory 307 may be a hard disk drive, a Flash disk, a Random Access Memory (RAM), a memory chip, or the like. In some exemplary embodiments, Memory 307 may retain program code operative to cause Processor 302 to perform acts associated with any of the subcomponents of Apparatus 300.

In some exemplary embodiments, a Data Set 385 may comprise instances. Each instance may comprise a valuation of a feature vector. It may be noted that Apparatus 300 may not have a direct access to Data Set 385, may have a partial access to Data Set 385, or the like.

In some exemplary embodiments, a Governance Enforcer 310 may be configured to apply Governance Data 305 on Data Set 385 to obtain Partial Data Set 315. Partial Data Set 315 may comprise partial instances. Each partial instance may comprise a partial feature vector. The partial feature vector may be determined based on a subset of the feature vector of Data Set 385.

In some exemplary embodiments, GIA Generator 320 may be configured to generate a Governance Impact Assessment 325 for Partial Data Set 315. Governance Impact Assessment 325 may comprise information about data excluded from Data Set 385 after applying Governance Data 305.

In some exemplary embodiments, GIA Generator 320 may be configured to obtain a log generated by Governance Enforcer 310 while applying Governance Data 305 on Data Set 385. GIA Generator 320 may be configured to analyzing the log to identify excluded instances that are excluded from Partial Data Set 315 or excluded features that are excluded from the partial feature vector related to Partial Data Set 315.

In some exemplary embodiments, a Machine Learning Model 330 may be trained based on Partial Data Set 315. Machine Learning Model 330 may be configured to provide an estimated prediction for a partial instance. In some exemplary embodiments, a set of Core Features 335 may be determined based on Machine Learning Model 330. Core Features 335 may comprise dominant features and target features.

In some exemplary embodiments, Bias Mitigation Module 340 may be configured to identify a bias introduced by the data governance. Bias Mitigation Module 340 may be configured to determine, for each core feature in Core Features 335, whether Governance Impact Assessment 325 indicates that the core feature is affected by the data governance.

Additionally or alternatively, Bias Mitigation Module 340 may be configured to mitigate the bias introduced by the data governance. In response to identifying a bias, Bias Mitigation Module 340 may be configured to apply an anti-bias procedure on Machine Learning Model 330.

In some exemplary embodiments, Feature Relevance Function Creator 350 may be configured to determine, based on Governance Impact Assessment 325, that a core feature of Core Features 335 is excluded or obfuscated from Partial Data Set 315. Feature Relevance Function Creator 350 may be configured to generate a Feature Relevance Function 355 for the excluded core feature. Feature Relevance Function 355 may be configured to provide a relevance score of the excluded core feature to the prediction made by Machine Learning Model 330.

In some exemplary embodiments, Feature Relevance Function 355 may be transmitted to an entity having access to Data Set 385, such as Apparatus 380. Feature Relevance Function 355 may be transmitted to Apparatus 380 via I/O Module 305. Relevance Score Calculator 381 of Apparatus 380 may be configured to execute Feature Relevance Function 355 on Data Set 385. Apparatus 380 may provide the score to Apparatus 300, such as via I/O Module 305. As a result, Bias Mitigation Module 340 may obtain the relevance score without having access to Data Set 385.

In some exemplary embodiments, Feature Relevance Function Creator 350 may be configured to generate Feature Relevance Function 355 based on a distribution of values of the excluded code feature in different prediction categories that are defined using the machine learning model.

Additionally or alternatively, Feature Relevance Function Creator 350 may be configured to generate Feature Relevance Function 355 based on a difference in performance measurement of Machine Learning Model 330 compared to an Alternative Machine Learning Model 383. Alternative Machine Learning Model 383 may be trained using an Augmented Data Set 384. Augmented Data Set 384 may comprise augmented instances each of which comprises valuation of the partial feature vector and of the excluded feature. Additionally or alternatively, Augmented Data Set 384 may comprise Partial Data Set 315 and data related to the excluded feature.

In some exemplary embodiments, in response to the relevance score being above a predetermined threshold, Apparatus 300 may be configured to issue an alert.

Referring now to FIG. 4 showing a governance log data, in accordance with some exemplary embodiments of the disclosed subject matter.

In some exemplary embodiments, data governance may be configured to enforce proper usage of personal or sensitive data as defined by policies data subject preferences, or the like. As data is accessed, stored, or transferred the governance module may be responsible for invoking the governance policies on the data. Such function may be to filter out certain data, obfuscate the data, allow the data to be used as is, or the like. While doing this the governance module may be configured to log what it has done and on what the decision was based. As an example, Apache Ranger™ log is represented in FIG. 4. Apache Ranger™ is an open source governance module. Apache Ranger™ log data may comprise information about governance decisions.

In some exemplary embodiments, the log data may be utilized to generate data governance summary. As an example, the log may comprise information indicating that a data of particular person has been excluded from the derived data set due to a policy or a law that dictates that location data of people under the age of 18 may not be used for the purpose for which the data set is being generated. As another example, personal data of data subjects from Germany may not be included in the derived data set if it will be used outside of Germany. On the other hand, the data associated with a data subject who has provided their consent may be included in the derived data set and the reason for its inclusion may be found in the log.

Figure 5:
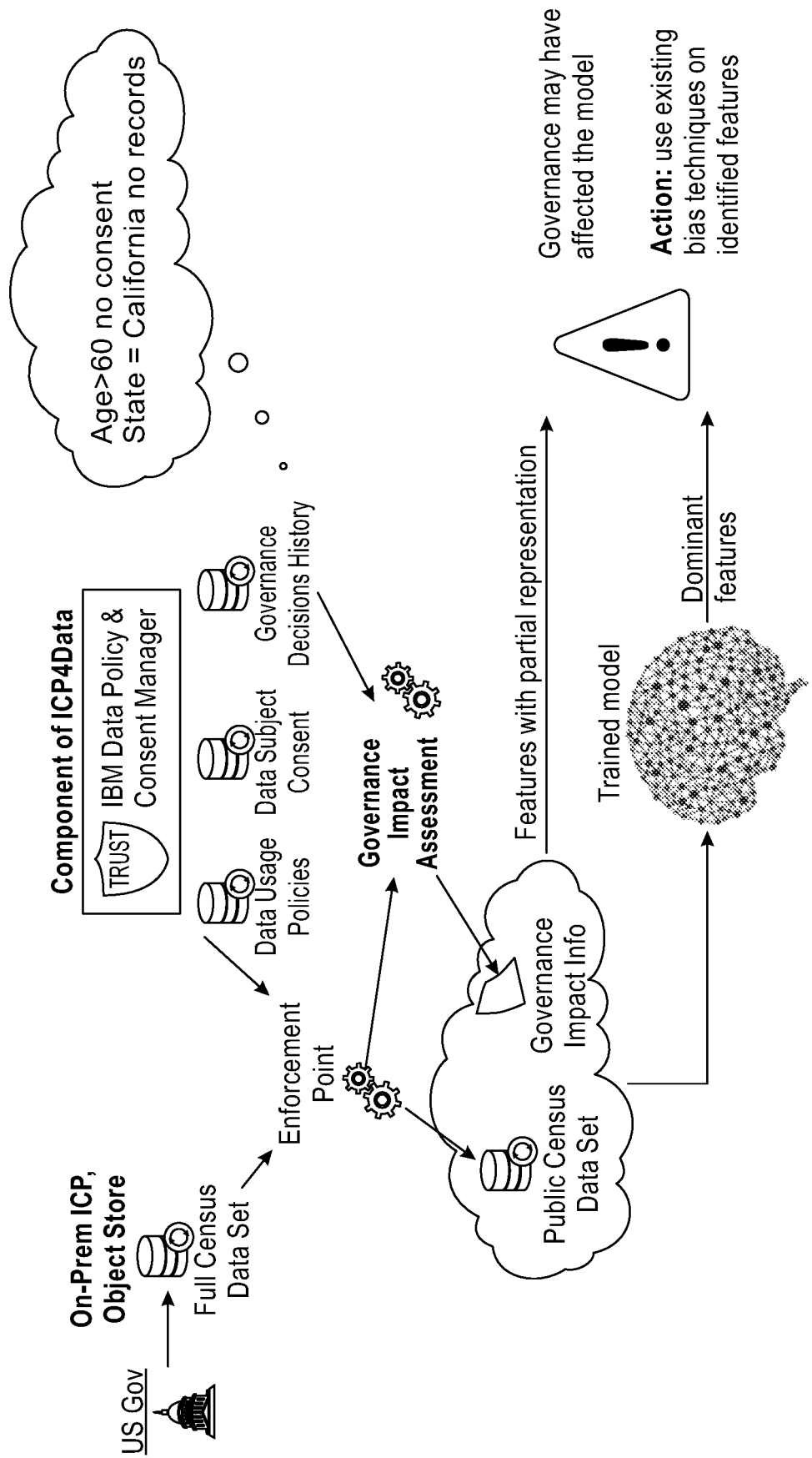
FIG. 5 shows a schematic illustration of an exemplary environment and architecture, in accordance with some exemplary embodiments of the disclosed subject matter.

Referring now to FIG. 5 showing a schematic illustration of an exemplary environment and architecture, in accordance with some exemplary embodiments of the disclosed subject matter.

In some exemplary embodiments, data governance impact summary may be utilized to determine the impact on the machine learning model when data records are excluded from the partial data set. It may be important to understand whether the excluded data records introduce bias into the machine learning model.

In some exemplary embodiments, the governance implications summary may include effects on features included in the derived data set, represented as 'Affected-features'. Affected-features may be a potential cause for bias. An affected-feature may be flagged as suspected of bias if it is also a high-importance feature in the model trained using the given data. A simple algorithm may identify the bias-suspected features as features that belong to the intersection of the affected-features group and the important-features group. The important-features group may be computed once a model has been trained, based on the model itself, or via black box techniques such as LIME.

In some exemplary embodiments, bias-suspected features may be sent to an entity that holds the entire data set, such as the data owner, for bias detection. The Identification of the suspected features may be an important input for directing the bias detection techniques. The method of the disclosed subject matter may provide this information so that any bias detection technique can utilize it.

Figure 6:
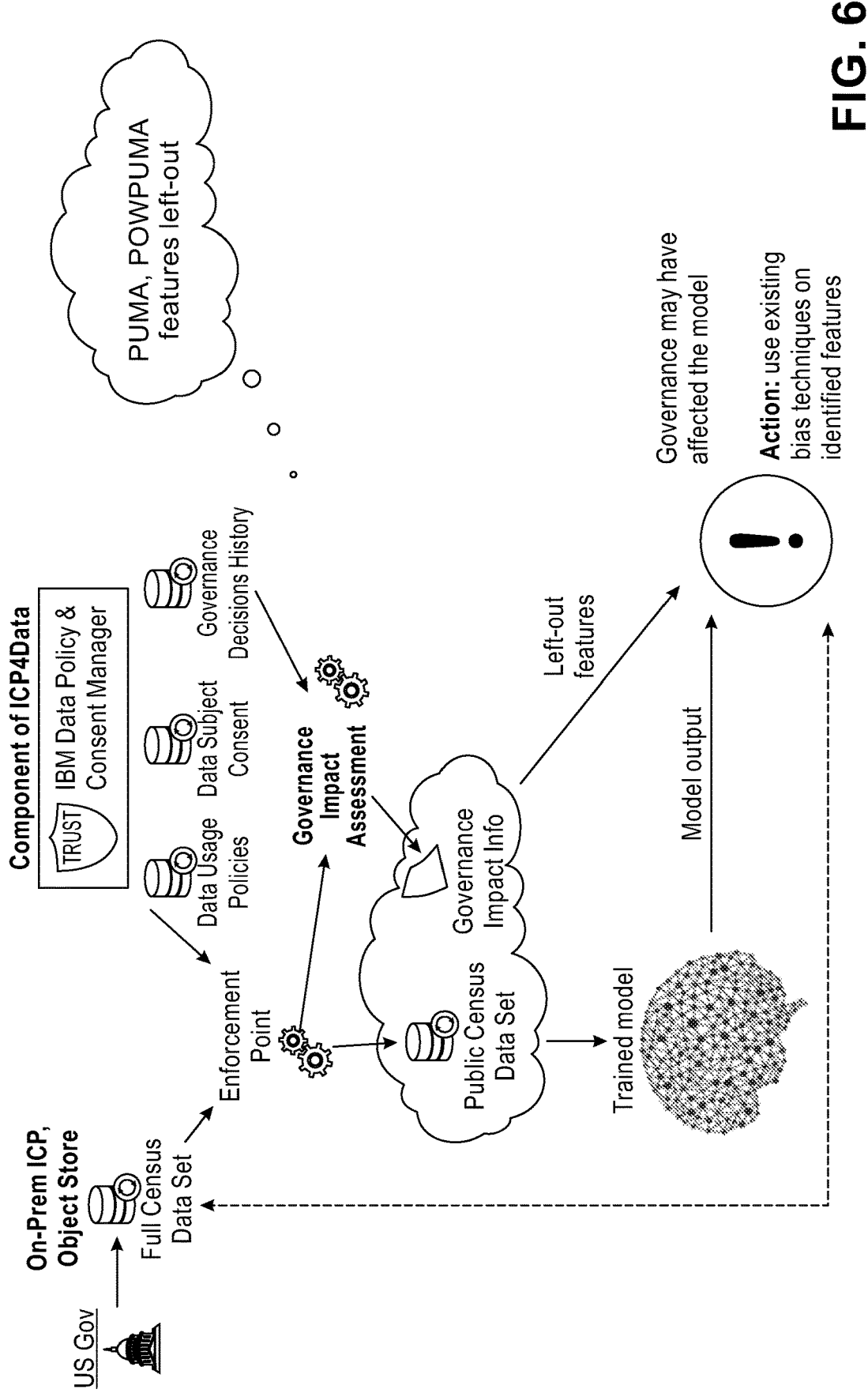
FIG. 6 shows a schematic illustration of an exemplary environment and architecture, in accordance with some exemplary embodiments of the disclosed subject matter.

Referring now to FIG. 6 showing a schematic illustration of an exemplary environment and architecture, in accordance with some exemplary embodiments of the disclosed subject matter.

In some exemplary embodiments, data governance impact summary may be utilized to determine the impact on the machine learning model when data features are excluded from the partial data set. When features are excluded from the data, they may be excluded from any model that uses that data for training. Such situation may have dire implications if the excluded features are relevant to the learning goal. It may be highly challenging to check such implications as the machine learning model naturally does not contain these features.

In some exemplary embodiments, an entity, such as the owner of the data, may have ab access to the entire data and can run risk assessment code on the full data set, based on the machine learning model learned from the partial data set. The governance implications technique may create a feature relevance function and sends it to the owner of the original data set for execution. The owner may run the function on the full data set, and return a score for each feature that was removed from the derived data set. A high score may indicate that the removed feature affects the model.

In some exemplary embodiments, different possible implementations for a feature relevance function may exist. One implementation may be to investigate the distribution of values of the excluded features per the model classification or prediction categories and raise the implication score if it is significantly different per category. Another possible implementation may involve retaining the model. However, such implementation may not always be possible. The feature relevance function may require the owner to re-train a model while adding a single excluded feature every time, all excluded features at once, or the like. The implication score may be raised if the results are significantly different compared to those of the model trained on the data without the excluded features.

AN EMBODIMENT

In one embodiment, the feasibility of the disclosed subject matter may be demonstrated by applying the disclosed techniques on a US government Census data set. The embodiment shows that it may be possible to extract governance implications from a governance enforcement engine and encode them as meta data. The embodiment further shows that the governance implications may be effectively utilized to alert on data issues that negatively affect the machine learning model trained on the governed data subset. The embodiment demonstrates this for excluded data records, simulating no-consent situations.

In the embodiment, experiments are run on the US American Community Survey from the US Census Bureau. In this survey, approximately 3.5 million households per year are asked detailed questions about who they are and how they live. Many topics are covered, including education, work, and transportation. The result is over 600 MB data set with over 280 features. The embodiment concentrates on transportation and followed a common usage of the data in which a classifier is trained to predict the transportation means that a person uses in order to get to work. A multi-label classification task is performed and includes labels such as car, train, ferry, bus, taxi, and motorcycle.

One example of governance policies for the experiments in the embodiment is that California residents' information is excluded due to new strict privacy law. This resulted in 18233 records being excluded from the governed data subset. Another example of governance policies for the experiments in the embodiment is that people over 60 nationwide tended not to provide consent for their information to be included in the public data. This resulted in 14554 records being excluded from the governed data subset. Yet another example of governance policies for the experiments in the embodiment is that PUMA™, POWPUMA™ codes (granular location information) were excluded entirely to prevent easy cross reference. These specific features of all records were excluded from the governed data subset.

In the embodiment, governance impact summary may be created. Governance implications are extracted and encoded, using IBM's DPCM governance engine. A general purpose called "Commercial Use of Census Data" is created for the experiment about the use of US census data for public transportation planning, as shown in FIG. 7. Due to strict privacy regulations in California, no personal data of US citizens living in California is allowed to be included in the data subset that will be used for by our machine learning model. Such policy is detailed in FIG. 8.

In the embodiment, the experiment shows that people over the age of 60 years do not tend to provide consent for the use of their personal data. This is captured in DPCM users' consent settings, some examples of which are shown in FIG. 9. When accessing or sharing data, a data governance enforcement point is used to generate a compliant subset of the original data based on the purpose for which the data will be used, and the geography which determines the relevant policies and laws. The enforcement point filters and transforms the full data set based on the policies and data subject preferences. During this process, all decisions about which data is included and excluded is logged. FIG. 10 shows examples of governance queries, as would be invoked by the enforcement point, and the governance decisions which are stored to the log. A log entry is made as a result of a request, for example, denying the use of John Doe's personal data because he resides in California. Sally Smith and Joe Harrison don't live in California, but they both are over 60 and both denied consent for the use of their personal data.

In the embodiment, each governance decision log entry contains the following information: Purpose, Data subject ID, Access Type (e.g., process, share with 3rd party), Approved (yes, no), Data item (feature), Reason code for the approval or denial, Reason description, Policy on which the decision was based, and various other fields not relevant to this discussion.

In the embodiment, for each feature (known as a data item in DPCM) there is an entry in the governance decision log. The log is parsed for creating and interim data structure as defined in FIG. 11, showing interim governance data in JSON™ format. A summary about what data was included and excluded, as FIG. 12 shows. Such summary may exclude information about important features such as geography, age, gender, race and other such personal information which may not be part of the source data set, but could influence the machine learning model's results. If such information exists in a profile management system that can be cross referenced, this data can be generated by taking the interim summary and correlating it with information from the profile system, as shown in FIG. 13. The list of profile features is added the governance impact summary, indicating for each the percentage excluded for each data item. The final summary is then shown in FIG. 14.

In the embodiment, the governance implications summary can be effectively utilized to raise alerts regarding potential machine learning model under-performance. In the experiments governance implications are leveraged. A random forest classifier is trained with a target of transportation means feature.

FIG. 15 shows the results of analyzing the model important features and intersecting the resulting group of features with the features that the governance implication method marked as affected. This method is relevant when the features exist in the data provided for training. The resulting features are indeed two of the features that were under-represented as a result of simulating governance policies on the full data. The meaning of model-important features is that any changes to the distribution of these features is likely to affect the model results. Because the model owners now know that there are important features that were under-represented, and they know which features they are, they actually know in advance that it is highly likely that the model is biased. In the embodiment, people over 60 and people from California are under-represented and age and state are important model features. Assume that elderly people use public transportation more. The model is likely to miss that. Also, assume that people in California tend to bike and walk more, the model is likely to miss that. However, because utilizing the governance impact analysis summary alerts on these governance implications, the model owners can run existing bias detection and alleviation techniques, as FIG. 5 describes, to reduce the model under-performance for people over 60 and people from California.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/ or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method comprising:
   obtaining a governance impact assessment for a partial data set, wherein the partial data set is generated by applying a data governance enforcement on a data set, wherein the data set comprises instances, each of which comprises a valuation of a feature vector, wherein the partial data set comprises partial instances each of which comprises a partial feature vector that is based on a subset of the feature vector, wherein the governance impact assessment comprises information about data excluded from the data set;
   obtaining a machine learning model, wherein the machine learning model is trained based on the partial data set, wherein the machine learning model is configured to provide an estimated prediction for a partial instance;
   determining a set of core features;
   for each core feature in the set of core features, determining whether the governance impact assessment indicates that the core feature is affected by the data governance, whereby identifying a bias introduced by the data governance; and
   in response to the identification of the bias, applying an anti-bias procedure on the machine learning model, whereby mitigating the bias introduced by the data governance.

2. The method of claim 1, further comprises:
   determining, based on the governance impact assessment, that a core feature of the set of core features is excluded from the partial data set;
   generating a feature relevance function for the excluded core feature, wherein the feature relevance function is configured to provide a relevance score of the excluded core feature to the prediction made by the machine learning model;
   obtaining the relevance score that is computed based on an execution of the feature relevance function on the data set; and
   in response to the relevance score being above a predetermined threshold, issuing an alert.

3. The method of claim 2, wherein said obtaining the relevance score comprises: transmitting the feature relevance function to an entity having access to the data set, executing, by the entity, the feature relevance function on the data set, and receiving from the entity the relevance score, whereby obtaining the relevance score without having access to the data set.

4. The method of claim 2, wherein the feature relevance function is based on a distribution of values of the excluded code feature in different prediction categories, wherein the prediction categories are defined using the machine learning model.

5. The method of claim 2, wherein the feature relevance function is based on a difference in performance measurement of the machine learning model compared to an alternative machine learning model, wherein the alternative machine learning model is trained using an augmented data set that comprises augmented instances each of which comprises valuation of the partial feature vector and of the excluded feature.

6. The method of claim 1, wherein said determining a set of core features comprises identifying at least one of a dominant feature and a target feature.

7. The method of claim 1, wherein said obtaining the governance impact assessment for the partial data set comprises:
   obtaining a log generated by a governance enforcer, wherein the data governance enforcement is performed by the governance enforcer; and
   analyzing the log to identify excluded instances that are excluded from the partial data set and excluded features that are excluded from the partial feature vector.

8. The method of claim 1, wherein the data governance enforcement enforces policies of General Data Protection Regulation (GDPR).

9. A computerized apparatus having a processor, the processor being adapted to perform the steps of:
- obtaining a governance impact assessment for a partial data set, wherein the partial data set is generated by applying a data governance enforcement on a data set, wherein the data set comprises instances, each of which comprises a valuation of a feature vector, wherein the partial data set comprises partial instances each of which comprises a partial feature vector that is based on a subset of the feature vector, wherein the governance impact assessment comprises information about data excluded from the data set;
- obtaining a machine learning model, wherein the machine learning model is trained based on the partial data set, wherein the machine learning model is configured to provide an estimated prediction for a partial instance;
- determining a set of core features;
- for each core feature in the set of core features, determining whether the governance impact assessment indicates that the core feature is affected by the data governance, whereby identifying a bias introduced by the data governance; and
- in response to the identification of the bias, applying an anti-bias procedure on the machine learning model, whereby mitigating the bias introduced by the data governance.

10. The computerized apparatus of claim 9, wherein the processor is further adapted to perform the steps of:
- determining, based on the governance impact assessment, that a core feature of the set of core features is excluded from the partial data set;
- generating a feature relevance function for the excluded core feature, wherein the feature relevance function is configured to provide a relevance score of the excluded core feature to the prediction made by the machine learning model;
- obtaining the relevance score that is computed based on an execution of the feature relevance function on the data set; and
- in response to the relevance score being above a predetermined threshold, issuing an alert.

11. The computerized apparatus of claim 10, wherein said obtaining the relevance score comprises: transmitting the feature relevance function to an entity having access to the data set, executing, by the entity, the feature relevance function on the data set, and receiving from the entity the relevance score, whereby obtaining the relevance score without having access to the data set.

12. The computerized apparatus of claim 10, wherein the feature relevance function is based on a distribution of values of the excluded code feature in different prediction categories, wherein the prediction categories are defined using the machine learning model.

13. The computerized apparatus of claim 10, wherein the feature relevance function is based on a difference in performance measurement of the machine learning model compared to an alternative machine learning model, wherein the alternative machine learning model is trained using an augmented data set that comprises augmented instances each of which comprises valuation of the partial feature vector and of the excluded feature.

14. The computerized apparatus of claim 9, wherein said determining a set of core features comprises identifying at least one of a dominant feature and a target feature.

15. The computerized apparatus of claim 9, wherein said obtaining the governance impact assessment for the partial data set comprises:
- obtaining a log generated by a governance enforcer, wherein the data governance enforcement is performed by the governance enforcer; and
- analyzing the log to identify excluded instances that are excluded from the partial data set and excluded features that are excluded from the partial feature vector.

16. The computerized apparatus of claim 9, wherein the data governance enforcement enforces policies of General Data Protection Regulation (GDPR).

17. A computer program product comprising a non-transitory computer readable storage medium retaining program instructions, which program instructions when read by a processor, cause the processor to perform a method comprising:
- obtaining a governance impact assessment for a partial data set, wherein the partial data set is generated by applying a data governance enforcement on a data set, wherein the data set comprises instances, each of which comprises a valuation of a feature vector, wherein the partial data set comprises partial instances each of which comprises a partial feature vector that is based on a subset of the feature vector, wherein the governance impact assessment comprises information about data excluded from the data set;
- obtaining a machine learning model, wherein the machine learning model is trained based on the partial data set, wherein the machine learning model is configured to provide an estimated prediction for a partial instance;
- determining a set of core features;
- for each core feature in the set of core features, determining whether the governance impact assessment indicates that the core feature is affected by the data governance, whereby identifying a bias introduced by the data governance; and
- in response to the identification of the bias, applying an anti-bias procedure on the machine learning model, whereby mitigating the bias introduced by the data governance.

18. The computer program product of claim 17, wherein the processor is further adapted to perform the steps of:
- determining, based on the governance impact assessment, that a core feature of the set of core features is excluded from the partial data set;
- generating a feature relevance function for the excluded core feature, wherein the feature relevance function is configured to provide a relevance score of the excluded core feature to the prediction made by the machine learning model;
- obtaining the relevance score that is computed based on an execution of the feature relevance function on the data set; and
- in response to the relevance score being above a predetermined threshold, issuing an alert.

19. The computer program product of claim 18, wherein said obtaining the relevance score comprises: transmitting the feature relevance function to an entity having access to the data set, executing, by the entity, the feature relevance function on the data set, and receiving from the entity the relevance score, whereby obtaining the relevance score without having access to the data set.

20. The computer program product of claim 18, wherein the feature relevance function is based on a distribution of values of the excluded code feature in different prediction categories, wherein the prediction categories are defined using the machine learning model.

* * * * *